United States Patent [19]
Horvath

[11] 3,824,539

[45] July 16, 1974

[54] VEHICLE TAMPER ALARM SYSTEM

[76] Inventor: Paul J. Horvath, 6956 Quebec St., Vancouver, British Columbia, Canada

[22] Filed: Jan. 10, 1973

[21] Appl. No.: 322,512

[52] U.S. Cl............... 340/65, 200/42 R, 200/61.45, 307/10 AT
[51] Int. Cl. .......................................... B60r 25/10
[58] Field of Search ............ 340/63, 64, 65, 52 H; 200/42 R, 61.45, 61.52; 307/10 AT

[56] References Cited
UNITED STATES PATENTS
| | | | |
|---|---|---|---|
| 2,238,246 | 4/1941 | Chapel................................. | 340/63 |
| 2,935,730 | 5/1960 | Procter............................... | 340/63 |
| 3,699,515 | 10/1972 | Barnett............................... | 340/65 |

Primary Examiner—Alvin H. Waring
Attorney, Agent, or Firm—Fetherstonhaugh & Co.

[57] ABSTRACT

An alarm network for incorporation in a vehicle having a battery, horn and headlights, in which a relay switch is provided controlling the power supply from the battery to the horn and headlights. The relay has a control circuit with which a flasher switch is associated so as to cause repeated opening and closure of the relay switch, a thermally responsive cutout switch, and various tamper responsive switches which close upon interference with the vehicle in an anticipated manner. A master switch is also provided in association with the vehicle door lock, the master switch being operable by rotation of a key in the lock.

3 Claims, 5 Drawing Figures

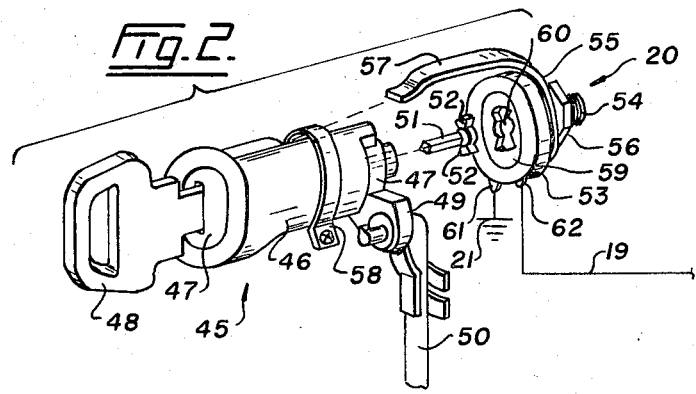
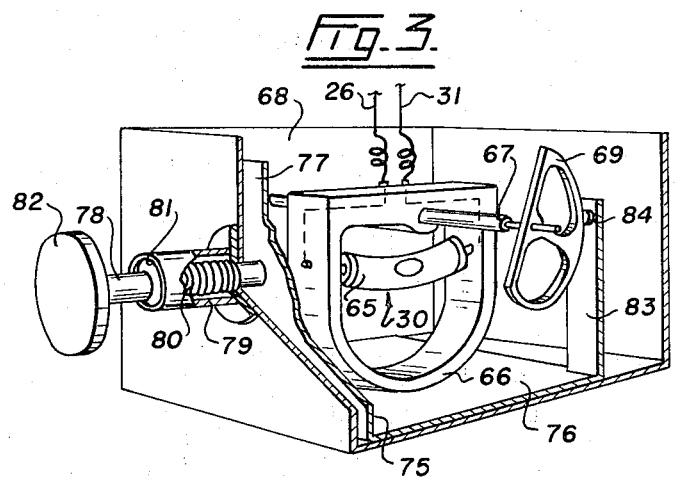
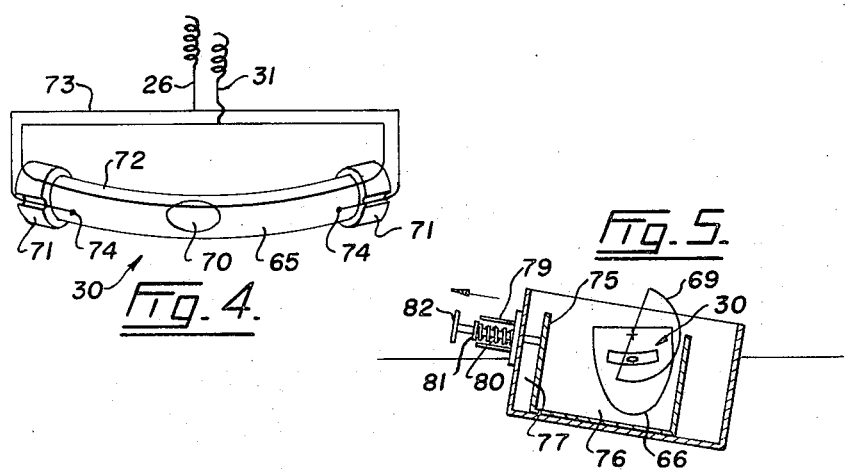

VEHICLE TAMPER ALARM SYSTEM

The invention relates to a tamper responsive alarm initiating network in or for use in a vehicle having a battery and electrically operable signalling means.

Alarm systems are known in which a code system is used to set the system, but such arrangements are complicated and time consuming and can only be used by the owner of the vehicle. This precludes use by members of his family. In other systems, hidden switches are used but these are easily forgotten, giving rise to inadvertent false alarms caused by the owner. In addition, some systems utilize a delay switch to hold the alarm temporarily inoperative when a door is opened so that the hidden master switch may be opened by the driver. Such arrangements allow an experienced intruder to disconnect the power supply.

It is among the objects of the present invention to provide such a network in or for use in a vehicle which is activated by the vehicle door key and whereby an alarm is given instantaneously when the vehicle is tampered with and so that no opportunity is given for the intruder to deactivate the system by interference with the power supply from the battery.

The invention therefore provides a relay switch connected in a first circuit with said battery and said signalling means for controlling the power supply to said signalling means, said relay switch having an electrically operable control element, a manually operable master switch and a tamper switch connected in a second circuit with said battery and relay control element for controlling the power supply to said control element, said tamper switch being adapted to be mounted in the vehicle, so that, when said master switch is closed, the tamper switch closes the second circuit in response to interference with the vehicle in an anticipated manner, and electrically operable means associated with said second circuit for automatically and repetitively interrupting the power supply to the relay control element, whereby said electrically operable signalling means are caused to operate intermittently.

The tamper switch may be a pushbutton switch associated with a vehicle door or the hood or trunk lid, or may comprise a tilt sensitive switch responsive to rocking movement of the vehicle.

One embodiment of the invention will now be described with reference to the accompanying drawings in which;

FIG. 2 is a perspective view of a rotary master switch in association with a vehicle door lock, FIG. 3 is a perspective view of a tilt sensitive mercury switch assembly, FIG. 4 is a detail of the assembly shown in FIG. 3, and FIG. 5 is a semi-diagrammatic view on the line 5—5 of FIG. 3 showing the mechanism for setting the mercury switch in a neutral position.

Figure 1:
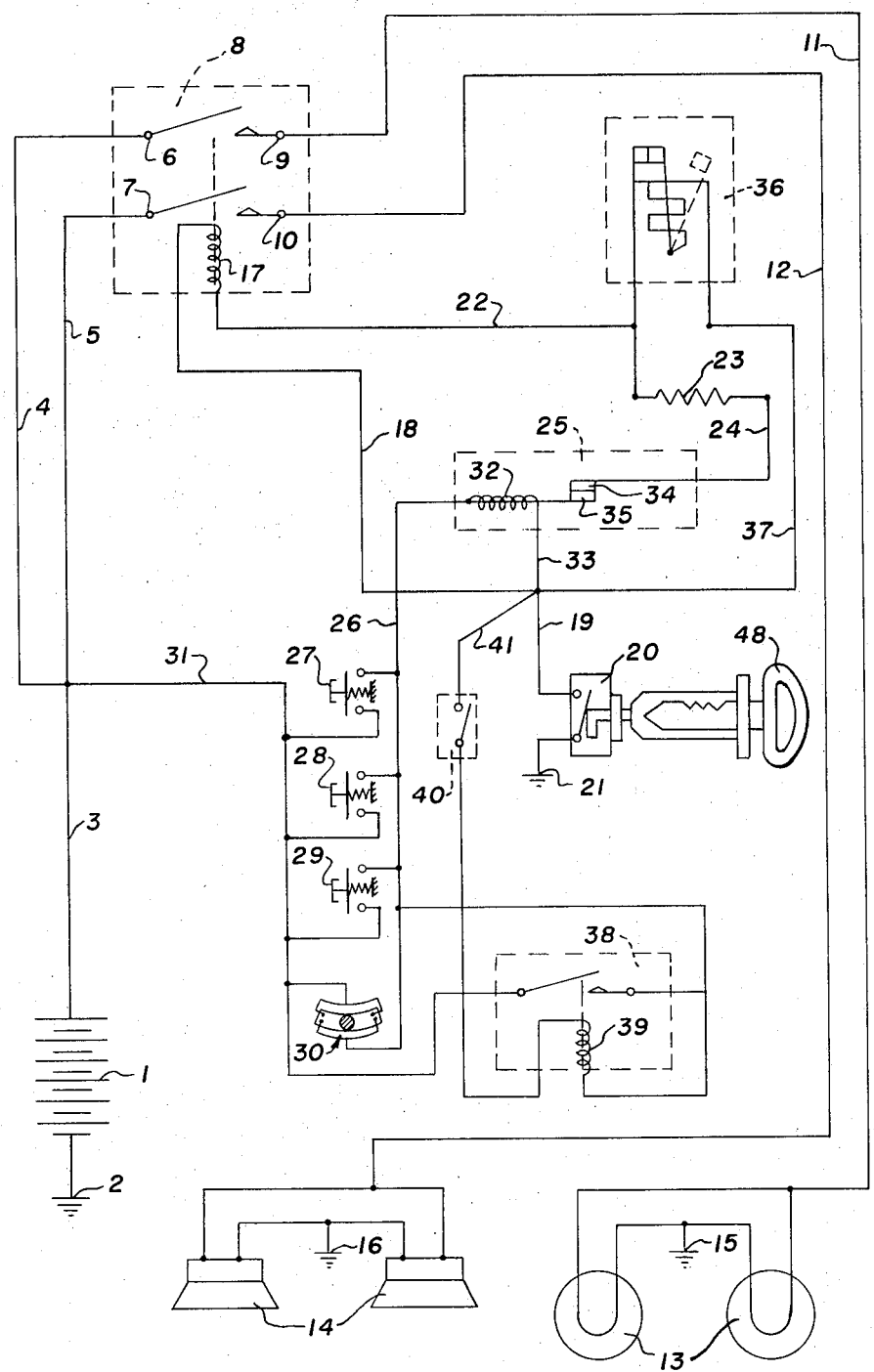
FIG. 1 is a circuit diagram of a network according to the invention.

Referring first to FIG. 1, the network shown comprises a battery 1 grounded at 2 through the vehicle chassis and having its positive terminal connected through lines 3, 4 and 5 to two poles 6 and 7 of a double pole relay switch 8. The other two poles 9 and 10 of the relay switch 8 are connected through lines 11 and 12 respectively to the headlights 13 and horn 14 of the vehicle, the circuit being completed through ground connections 15 and 16.

The relay switch 8 has a control coil 17, one side of which is connected, through lines 18 and 19 and a master control switch 20, to ground at 21.

The other side of the control coil 17 is connected through a line 22, a resistor 23, a line 24, a self-actuating thermal cut-out switch 25, a line 26, four tamper switches 27, 28 29 and 30 arranged in parallel, line 31 and line 3 to the positive of the battery 1.

The cut-out switch 25 comprises a heating coil 32 having one side connected to the line 26 and the other side connected through a line 33, line 19 and the master control switch 20 to ground 21. The cut-out switch 25 comprises two contacts 34 and 35 which separate to break the circuit when the heating coil 32 attains a sufficient temperature, this normally being set to occur at approximately 45 seconds from energization.

The tamper switches 27, 28 and 29 are associated respectively with the vehicle door, the hood and the trunk lid, and are of the pushbutton kind which are maintained in an opened condition when compressed against spring bias but which close upon release. These switches may conveniently comprise the switches normally used to operate the courtesy light in the interior of the vehicle when the doors are opened. The switch 30 comprises a tilt sensitive mercury switch which is described below in greater detail with reference to FIGS. 3 to 5.

One side of a flasher switch 36 is connected in parallel with the relay control coil 17 to one side of the resistor 23, the other side of the flasher switch 36 being connected through line 37, line 19 and the master control switch 20 to ground 21.

A holding relay switch 38 is connected in parallel with the tamper switches 27, 28, 29 and 30 and has a control coil 39 one side of which is connected to the line 26 and the other side of which is connected through an off/on switch 40, line 41, line 19 and master control switch 20 to ground 21.

Referring now to FIG. 2, this shows in exploded form the master control switch 20 in association with the door lock 45 of the vehicle. The door lock comprises a barrel 46 in which a cylinder 47 is rotatable by means of a key 48, the rear end of the cylinder being formed with a projecting lug 49 which is pivoted to part of the door latch mechanism shown at 50. The rear end of the cylinder 47 is axially recessed to receive a square pin 51 for rotation therewith. The pin 51 is provided at its rear end with a pair of radial dogs 52 for effecting rotary operation of the switch 20 as will be described below.

The switch 20 comprises an annular housing 53 from the rear of which a threaded stud 54 projects. The stud 54 receives thereon a washer 55 and a nut 56 which retains the washer against the housing. The washer comprises an axially bent tab 57 which, in the assembled condition of the lock and switch, is held against the barrel 46 of the lock by a circlip 58. Within the housing 53, a rotary contact disc 59 is retained, the disc 59 having a central shaped aperture 60 for co-operating engagement with the dogs 52 of the pin 51. The housing 53 has a pair of contacts 61 and 62 extending through the walls thereof, the contact 62 being insulated from the housing 53. The arrangement is such that when the key 48 is turned to lock the vehicle door, the contact disc 59 is rotated by the pin 51 so that an electrical connection is established between the contacts 61 and 62 within the switch. A sufficient clearance is provided between the dogs 51 and the shaped aperture 60 to permit rotation of the key 48 back from the locking position to the vertical position for removal, without disengaging its switch contacts. With this lock construction, the contacts 61 and 62 can only be disconnected by means of the key 48. Opening of the door by other means, for example by forcing the window and operating the inside handle, does not open the circuit.

Referring now to FIGS. 3, 4 and 5, the tilt sensitive switch 30 comprises a curved glass tube 65, best seen in FIG. 4 having its ends fixedly mounted in a yoke 66. The yoke 66 has a support spindle 67 extending therethrough and journalled at its ends in journals (not shown) provided in the walls of a box frame 68. At one end, the spindle 67 carries a quadrant plate 69 for rotation therewith.

As best seen in FIG. 4, the curved glass tube 65 has a mercury bead 70 therein which can move to either end of the tube in dependence upon its angular orientation. At each end, the tube is provided with a ferrule 71 of insulating material. The line 31 is connected to a loop 72 extending through the ferrule 71 and along the entire length of the tube, and the line 26 is connected to two lines 73 which terminate at ends 74 close to the ends of the tube. It will be seen that an electrical connection will be made between the lines 72 and 73 upon sufficient tilting movement of the tube, to cause the mercury beads 70 to move to either end of the tube.

Within the box frame 68, an L shaped slider member 75 is mounted, the horizontal limb 76 of which is slidable on the floor of the box frame. The vertical limb 77 of the slider member has a plunger 78 secured thereto and projecting through a wall of the box frame. Externally, the box frame is provided with a housing 79 for a coil spring 80, which bears against a flange 81 on the plunger so as to normally urge the plunger leftwardly as shown in the drawing. At its outer end, the plunger is provided with a pushbutton 82.

At the end remote from the limb 77, the slider member 76 is provided with an upstanding bar 83 which carries a button 84 of frictional material which normally engages the periphery of the quadrant plate 69.

In normal usage of the vehicle, with the master switch 20 open, pivoting of the yoke 67 is prevented by engagement between the button 84 and the quadrant disc 69. When the vehicle is parked on a hill or on a cambered road, prior to the driver leaving the vehicle, the button 82 is depressed to temporarily release the quadrant plate 69 so that the yoke assumes an equilibrium position under gravity. The mercury bead 70 thus locates centrally in the glass tube 65. Upon release of the button 82, the yoke 66 is again locked by engagement between the button 84 and the quadrant plate 69.

Referring again to FIG. 1, the network shown operates as follows. Upon parking the car, the driver initially closes the on/off switch 40 and sets the tilt sensitive switch 30 by depressing button 82 in the manner above described. After leaving the vehicle, the door is locked by means of the key 48 so that the switch 20 is closed. The system is now armed.

If an intruder now opens the door or the hood or trunk lid, or rocks the vehicle (or jacks it up, for example, to remove wheels), in such a way as to close any one of switches 27, 28, 29 or 30, a connection is immediately made from the battery through thermal cut-out switch 25 and resistor 23 to the coil 17 of relay switch 8. At the same time, the control coil 39 of holding relay 38 will be energized so that the relay will close. The closure of any one of the tamper switches will also energize the flasher switch 36 so that intermittent operation of the relay switch 8 will commence with corresponding intermittent operation of the headlights 13 and horn 14. Even if the tamper switch which was originally closed is now opened again, the holding relay will maintain the circuit through to the coil 17 so that the headlights and horn will continue to give an alarm signal. After approximately 45 seconds, the heating coil 32 attains a sufficient temperature to open the contacts 34 and 35 so as to break the circuit and so that the alarm signal ceases and battery overload is prevented. The occupant of the vehicle can at any time stop the operation of the system by use of the key 48 to open the master switch 20.

I claim:

1. In or for a vehicle having a battery and electrically operated signalling means, a tamper responsive initiating network comprising a relay switch connected in a first circuit with said battery and said signalling means for controlling the power supply to said signalling means, said relay switch having an electrically operable control element, a manually operable master switch in a second circuit with said battery and control element for controlling the power supply to said control element, said master switch comprising a body having switch contacts and being secured to a door lock assembly of the vehicle, a rotary switch member secured to the lock cylinder for rotation therewith and cooperable with the body whereby the switch is closed by rotation of a key in the lock to lock the vehicle, a plurality of tamper switches in the second circuit, some of tamper switches being pressure responsive switches each mounted for detecting the opening of an access member to the vehicle, one of said tamper switches being a tilt sensitive switch comprising a yolk in which said tilt sensitive switch is mounted, a shaft supporting said yolk and journalled to permit the tilt sensitive switch to tilt in its plane of operation, spring bias means normally operable to prevent rotation of the shaft and manually operable against spring bias to release the shaft so that the yolk assumes an equilibrium position with the tilt sensitive switch inoperable, said spring bias means then again retaining the shaft against rotation, and electrically operable means associated with said second circuit for automatically and repetitively interrupting the power supply to the relay control element whereby said electrically operable signalling means is cause to operate intermittently.

2. A network as claimed in claim 1, wherein said second circuit further comprises a self actuating thermal cut-out switch connected in series between said battery and relay control element, for opening the second circuit a predetermined time after closure.

3. A network as claimed in claim 1, wherein said second circuit further comprises a holding relay in parallel with said tamper switches.

* * * * *